May 25, 1954  M. R. EUVERARD  2,679,236
VALVE ACTUATING MECHANISM
Filed June 17, 1952  2 Sheets-Sheet 1

INVENTOR.
Maynard R. Euverard
BY
ATTORNEY.

INVENTOR.
Maynard R. Euverard
BY
ATTORNEY.

Patented May 25, 1954

2,679,236

UNITED STATES PATENT OFFICE 2,679,236

VALVE ACTUATING MECHANISM

Maynard R. Euverard, Short Hills, N. J., assignor to Interchemical Corporation, New York, N. Y., a corporation of Ohio Application June 17, 1952, Serial No. 294,033

1 Claim. (Cl. 121—164)

This invention relates to an improved valve actuating mechanism of which the following is a specification.

In my co-pending application Serial No. 233,809, filed June 27, 1951, of which this is a continuation-in-part, I have disclosed a fluid proportioning device. The present disclosure pertains to certain improvements of the said fluid proportioning device which will be found described in detail in the specification and illustrated in the accompanying drawings, in which.

Figure 1:
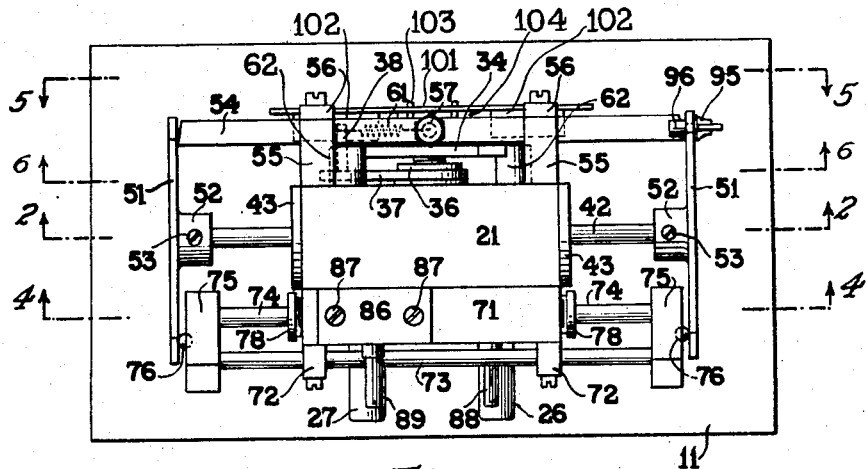
Fig. 1 is a plan view of the assembled device.
Figure 2:
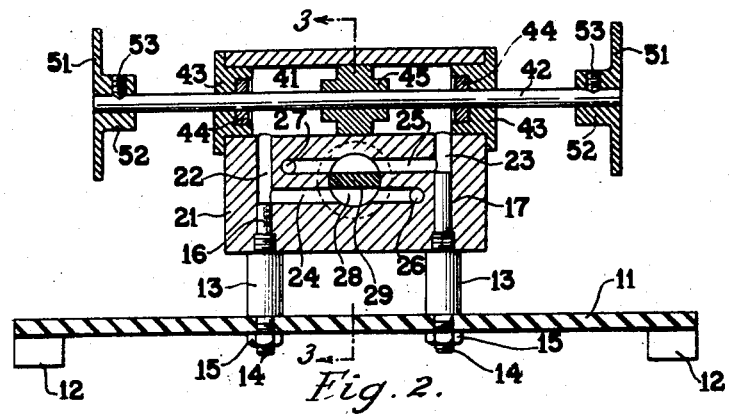
Fig. 2 is a sectional view taken on the line 2—2 in Fig. 1.

Referring more specifically to the drawings, according to the said patent and shown in this application, the device is fastened to a base plate 11 which rests on the bars 12. As illustrated, one way of mounting the device is by means of two columns 13 provided with threaded shanks 14 that are set into the base and are fastened thereto by means of the nuts 15. The threaded shafts 16 and 17 extending upward of the columns are dimensioned so as to fit into and to partly plug the borings 22 and 23 drilled vertically through the block 21 of the metering device. The open portions of these borings communicate with the conduits 24 and 25 drilled horizontally through the block. The first of the said conduits connects to the fluid inlet 26 and the second connects to the fluid outlet 27. Inserted into the conduits is the valve port 28 fitted with the rotary valve 29 and the valve retainer 30. The valve is held in position by bearings 31 and 32 which, at the same time, serve as closures for the valve port. The valve is arranged to be turned by means of the valve stem 33 and the valve arm 34 having a valve arm pin 35 as shown.

The boring 41 drilled through the block constitutes the metering cylinder. As shown, this cylinder is in communication with the borings 22 and 23 and, by way of these borings, with the conduits 24 and 25 and the valve port 28. Inserted into the metering cylinder is the drive rod 42, held in alignment by the cylinder end caps 43 provided with gaskets 44. Fastened to the said drive rod and suitably fitted to reciprocate within the cylinder is the piston 45.

Attached to the said drive rod are two cross bars which, as indicated in Fig. 1, hold between themselves the valve spring tripping bar 54. However, I prefer to replace the cross bars by end plates 51, preferably having the shape of circular disks with opposite segments cut away. The end plates are provided with sleeves 52 which fit over the ends of the drive rod and are fastened thereto by means of the locking screws 53. Arranged between these end plates to be moved reciprocally by them but, preferably, not fixedly attached to them, is the said valve spring tripping bar. One way of avoiding a shift in the position of the end plates 51 about the axis of the main drive rod while the device is in operation is to lock the end plates to the valve spring tripping bar 54. For this purpose, the bolt 96 secured by the wing nut 95 is inserted into a slot 98 suitably provided at one of the end plates. This bolt and a stop pin 97 are spaced so as to confine one end of the valve spring tripping bar therebetween. By moving the bolt 96 out of the way of the valve spring tripping bar, the end plates can be turned into a position whereby they clear the valve spring tripping bar.

The valve spring tripping bar 54 is held by two brackets 55 and is retained in position by the caps 56 screwed onto the brackets. Fitted to the said bar is the bolt 57 which can be adjusted in length by the lock nut 58. Held between the valve bearing 32 and a retaining nut 36 is the valve plate 37 having a pin 38 and a groove 39. The groove has an about 45° circular curvature with the valve stem 33 as the center and is fitted to receive the pin 35 of the valve arm 34.

A spring 61 is fastened between the pin 38 of the valve plate and the bolt 57 of the valve spring tripping bar. The stops 62 serve to restrict the movement of the valve arm 34 and the valve plate 37 induced by the spring.

With the rotary valve 29 and the piston 45 in a position as shown, if a liquid under pressure enters through the fluid inlet 26, a direct passage of the liquid to the fluid outlet 27 is prevented by the rotary valve. The liquid is forced through the boring 22 into the space to the left of piston 45 and, because of its pressure, forces the piston to move to the right. The end plate 51 fastened to the drive rod 42 forces the valve spring operating bar 54 to move also to the right. The bolt 57, which is set into the said bar and to which one end of the spring 61 is attached, exerts an increasing tension upon the said spring. After, induced by the movement of the bar 54 and the bolt 57, the spring 61 has passed dead center, it quickly accelerates the valve plate 37 through 45°, providing the necessary lever arm and imparting sufficient velocity to the valve plate to turn the valve 29, practically instantaneously, through the extent of its rotation.

As a result of this 90° change in the position of the valve the incoming liquid is now forced to travel from the fluid inlet 26 through the right end of conduit 25, into the boring 23 and thence into the right hand space of cylinder 41, forcing the piston 45 to reverse its direction of travel. In the meantime, while the piston was moving to the right, liquid accumulated in front of the piston was forced through the fluid outlet 27.

Figure 3:
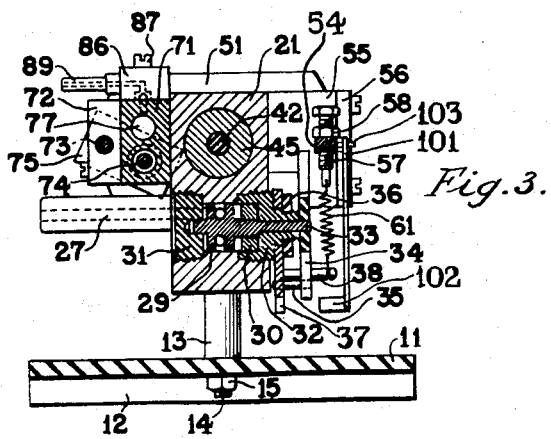
Fig. 3 is a sectional view taken on the line 3—3 in Fig. 2.
Figure 4:
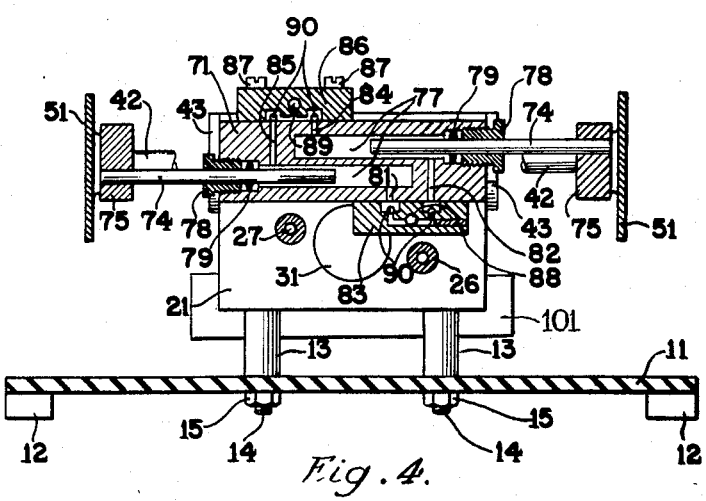
Fig. 4 is a sectional view taken on the line 4—4 in Fig. 1.
Figure 5:
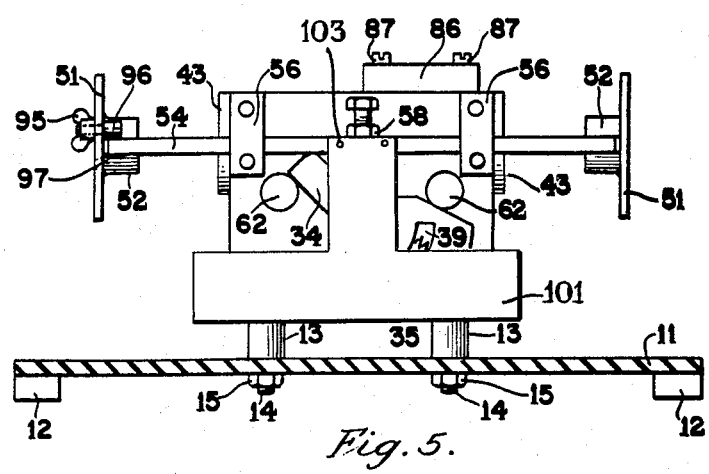
Fig. 5 is a rear elevation of the device.
Figure 6:
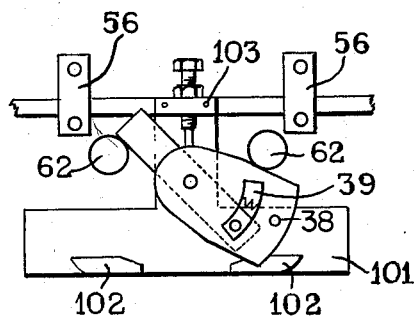
Fig. 6 is a sectional view taken on the line 6—6 in Fig. 1.

According to this invention, as shown most particularly in Figs. 1, 3, and 6, there has been added to the foregoing device a valve control slide frame 101 having two properly shaped valve control slide bars 102 attached to it. The valve control slide frame is fastened to the valve spring operating bar 54 by means of bolts such as the bolts 103 and is kept at the required distance from the said valve spring operating bar by means of the spacer 104. The valve control slide bars 102 are shaped and dimensioned in such a manner that the valve plate pin 38 in the course of its travel follows the path of roughly a figure 8 around these valve control slide bars, partly in contact therewith. As a result thereof, the spring 61, after having passed dead center, although induced by the movement of the bar 54 and the bolt 57, cannot immediately trip the valve arm 34 but is further stretched while the valve plate pin is forced to follow on either side the top surface of the valve control slide bar to its very end before the spring can act.

The main advantage of this improvement is that the stroke length of the piston 45 is fixed and that the rotational movement of the valve 29 is induced with greatly increased velocity because the spring 61 is stretched to a greater extent. Since the amount of stretch is now always constant, each tripping is effectuated by the same amount of energy. As a result of this improvement, the apparatus can be used as a metering device. The number of strokes times a constant equals the volume of fluid passing through the device. The constant represents the total displacement of the piston during one complete cycle. For metering purposes, a suitable cyclic counter such as a Veeder-Root counter, can be attached to the device and a suitable mechanical linkage between the counter and the reciprocating portion of the device can be provided in order to register the number of cycles during a given time of operation.

I claim:

In a metering device comprising a casing having a fluid inlet and a fluid outlet, a valve port, two conduits suitably spaced to traverse the valve port, the first of the said conduits connecting to the fluid inlet and the second connecting to the fluid outlet, a cylinder arranged parallel to the said conduits and suitably attached to the said casing ducts connecting the said conduits to opposite extremities of the said cylinder, a rotary valve arranged in the said valve port to permit the passage of incoming fluid through the first of the said ducts and the passage of outgoing fluid through the second of the said ducts when turned into one position, and to permit the passage of outgoing fluid through the first of the said ducts and the passage of incoming fluid through the second of the said ducts when turned into another position, closures for the valve port, a valve stem extending through one of the closures and having a valve arm with a valve arm pin, a valve plate which is rotatably held between the said closure and the said valve arm and has a valve plate pin and a curved valve plate groove fitting the said valve arm pin over an arc of about 45°, stops arranged to restrict the movement of the valve arm and the valve plate, end caps for the cylinder, a piston reciprocally fitting into the cylinder, a piston rod extending through the cylinder end caps, cross bars fastened to the tips of the piston rod, a valve spring tripping bar reciprocally fitted between the said cross bars and attached thereto parallel to the piston rod, and a spring, held between the said tripping bar and the said valve plate pin, which, upon liquid under pressure entering the said cylinder at one of the extremities and forcing the said piston and the said tripping bar in the direction of the other extremity, after passing dead center quickly accelerates the said valve plate into an arcuate motion of sufficient velocity to turn the said valve arm and the said rotary valve into a position which causes entry of liquid under pressure at the other extremity of the said cylinder, the improvement of two suitably shaped valve control slide bars placed in the path of travel of the said valve plate pin, so as to prevent the said spring from tripping the said valve arm immediately after having passed dead center, but to force the said valve plate pin to follow on either side the top surface of the said valve control slide bars to its very end before the spring can act.

References Cited in the file of this patent

UNITED STATES PATENTS

| Number | Name | Date |
| --- | --- | --- |
| 649,199 | Ely | May 8, 1900 |
| 883,972 | Rose | Apr. 7, 1908 |
| 1,981,840 | Hueber et al. | Nov. 20, 1934 |
| 2,060,684 | Moorhouse | Nov. 10, 1936 |
| 2,287,179 | Kocher | June 23, 1942 |